United States Patent [19]
Sabater et al.

[11] Patent Number: 5,589,941
[45] Date of Patent: Dec. 31, 1996

[54] DEVICE FOR THE MEASUREMENT OF A PROFILE ON A PLANE SURFACE

[75] Inventors: Jacques Sabater, Gif Sur Yvette; Guy E. P. Tourtollet, Tencin; Gérard Jayet, Oyeu, all of France

[73] Assignee: Centre Technique de L'Industrie des Papiers, Cartons et Celluloses, France

[21] Appl. No.: 421,053

[22] Filed: Apr. 12, 1995

[30] Foreign Application Priority Data

Apr. 12, 1994 [FR] France ................... 94 04672

[51] Int. Cl.$^6$ ............................................ G01B 11/02
[52] U.S. Cl. ................ 356/376; 356/384; 250/559.24; 250/559.27
[58] Field of Search .................... 356/371, 376, 356/381, 384; 250/559.08, 559.19, 559.22, 559.23, 559.24, 559.27, 559.44

[56] References Cited

U.S. PATENT DOCUMENTS

| | | | |
|---|---|---|---|
| 4,408,487 | 10/1983 | Tano | 250/559.27 |
| 4,650,333 | 3/1987 | Crabb et al. | 356/381 |
| 5,090,811 | 2/1992 | Donaldson | 356/376 |

FOREIGN PATENT DOCUMENTS

| | | |
|---|---|---|
| 0532257 | 3/1993 | European Pat. Off. . |
| 4129820 | 3/1993 | Germany . |
| 63-229311 | 9/1988 | Japan ................... 356/376 |
| 2116703 | 5/1990 | Japan . |
| 8902573 | 3/1989 | WIPO . |

Primary Examiner—F. L. Evans
Attorney, Agent, or Firm—Harris Beach & Wilcox, LLP

[57] ABSTRACT

Apparatus for measuring the relief profile of a score line mode in a substrate such as a paper board. A hand-held measuring head containing a light source illuminates the score line and the back-scattered light reflected therefrom is recorded by a CCD imager. The digital output of the imager is sent to a processor to determine one or more physical characteristics of the score line.

11 Claims, 3 Drawing Sheets

DEVICE FOR THE MEASUREMENT OF A PROFILE ON A PLANE SURFACE

BACKGROUND OF THE INVENTION

The invention relates to a novel device intended to allow the measuring of profiles, indented or in relief, on a plane surface of a paper or board material.

More specifically, the invention provides a device capable of measuring and determining the characteristics of a crease within a sheet of paper or board.

Although more particularly described together with a device for measuring the characteristics of the crease in a sheet of paper or board, the invention shall not be limited to this application alone, and any device capable of allowing measurement of a indented or relief profile with respect to a plane surface of a paper or board material is covered by the scope of the present invention.

Specifically, the crease is constituted by the residual deformation of a sheet of board or paper under the action of a scoring tool consisting of a die, termed the counterpiece, and of a punch, termed the scoring rule, of matching shape. The scoring of the sheets of board or paper is intended to allow the folding of said sheets with a view to making, in particular, packages. This technique is nowadays widely known, so that there is no need to describe it in further detail here.

Although widely known and used, this technique has a few flaws in its application. In fact, users thereof desire to be able to have a unit or device capable of allowing inspection of the quality and uniformity of the crease obtained, so as precisely either to correct the action of the scoring tools used, or to discard the sheets of board with improper creases or incorrect characteristics, precisely so as to ease the subsequent folding or even gluing operation.

However, currently, the controller of the machine at which the scoring tools are molted, controls his machine by, as sole quality reference, visual assessment of the crease.

Given the dimensions of the latter, namely typically a width of between 700 µm and 2 millimeters and a height of between 10 µm and 200 µm, the relative nature of such an assessment is appreciated, so that this visual inspection is not satisfactory nowadays.

SUMMARY OF THE INVENTION

The object of the invention is to provide an apparatus or device capable of measuring the various characteristics of this crease much more accurately, and particularly its height with respect to the general plane of the surface of the paperboard sheet, its width and possibly its off-centering, that is to say its symmetry or asymmetry with respect to the mediator of the more or less parabolic curve of the profile.

This device for the continuous or discrete measurement of an indented or relief profile contrived or made within a plane surface of a paper or board diffusing material, which device comprises:

a graspable measurement head, comprising:

a light source, associated with an objective lens, intended to convert the beam emanating from the source into an image in the form of a luminous streak, perpendicular to the profile to be measured, the orienting of said light beam being effected at an angle of incidence α whose value is close to the Brewster angle corresponding to the index of the material;

a unit for focusing the backscattered light from the surface thus illuminated, and especially from the profiles a matrix camera, at which said backscattered light is focused, converting the analog signals received into digital signals;

a processing assembly linked to the measurement head, comprising a calculator and intended, from the digital signals transmitted by the camera, to extract at least one of the geometrical characteristics defining the profile, namely its height defined with respect to the reference plane constituted by the surface itself, its width and/or its off-centering.

In other words, the invention consists, through optical and electronic means, in determining simply and easily the characteristics of the profile, and in obtaining them virtually instantaneously. Moreover, given the angle of incidence of the light beam on the medium examined, specular reflection is avoided.

For a sheet of paper or board, the value of the index is of the order of 1.5 and the Brewster angle is close to 56°.

According to another advantageous characteristic of the invention, the light source is linearly polarized, and its direction of polarization is parallel to the plane of incidence of the light rays on said material.

According to another advantageous characteristic of the invention, the matrix camera consists of a camera associated with a charge transfer circuit, whose definition is at least equal to 512×512 pixels, and advantageously furnished with electronic gain control.

According to the invention, the assembly of the various elements making up the reading head are centralized within a housing of parallelepipedal shape, the dimensions of which are advantageously reduced by contriving a mirror between the focusing unit and the camera.

Moreover, in order to facilitate manipulation when measuring the crease, the housing enclosing the reading head is of ergonomic form, including a plinth furnished with a through window, and a movable part, hinged to said plinth and including the reading head proper.

The processing unit advantageously comprises a sensory restore unit intended to allow the viewing of the information extracted from the camera by said assembly, or even the graphical representation of the profile examined.

Advantageously, this processing assembly consists of a microcomputer of compatible or some other type.

More specifically, the invention relates to a device for the continuous or discrete measurement of a relief profile constituted by a crease made within a sheet of paper or board, which device comprises:

a graspable measurement head comprising:

a collimated light source consisting of a laser diode, associated with a plano-cylindrical lens, intended to convert the laser beam emanating from the laser diode into a line perpendicular to the crease, whose characteristics it is sought to measure;

an objective, intended to focus the backscattered light from the sheet of paper or board thus illuminated;

a matrix camera associated with a charge transfer circuit, at which camera said reflected light is focused, and converting the analog signals received into digital signals;

a processing assembly linked by a coaxial mono-cable to the measurement head, consisting of a microcomputer incorporating a calculator intended, from digital signals transmitted by the camera, to extract the characteristics defining the profile, especially its height, its width and its off-centering;

a video screen, intended to allow the positioning of the profile and the centering of the measurement head with respect to the crease.

BRIEF DESCRIPTION OF THE DRAWINGS

The manner in which the invention may be embodied and the advantages which ensue therefrom will emerge better from the example embodiment which follows given by way of indication and without limitation, supported by the appended figures.

DESCRIPTION OF THE INVENTION

The description which follows refers more particularly to a device intended to measure and determine the geometrical characteristics of a crease in a sheet of paper or board. As already recalled in the preamble, this example embodiment is merely by way of indication, but shall in no event be regarded as limiting.

Figure 2:
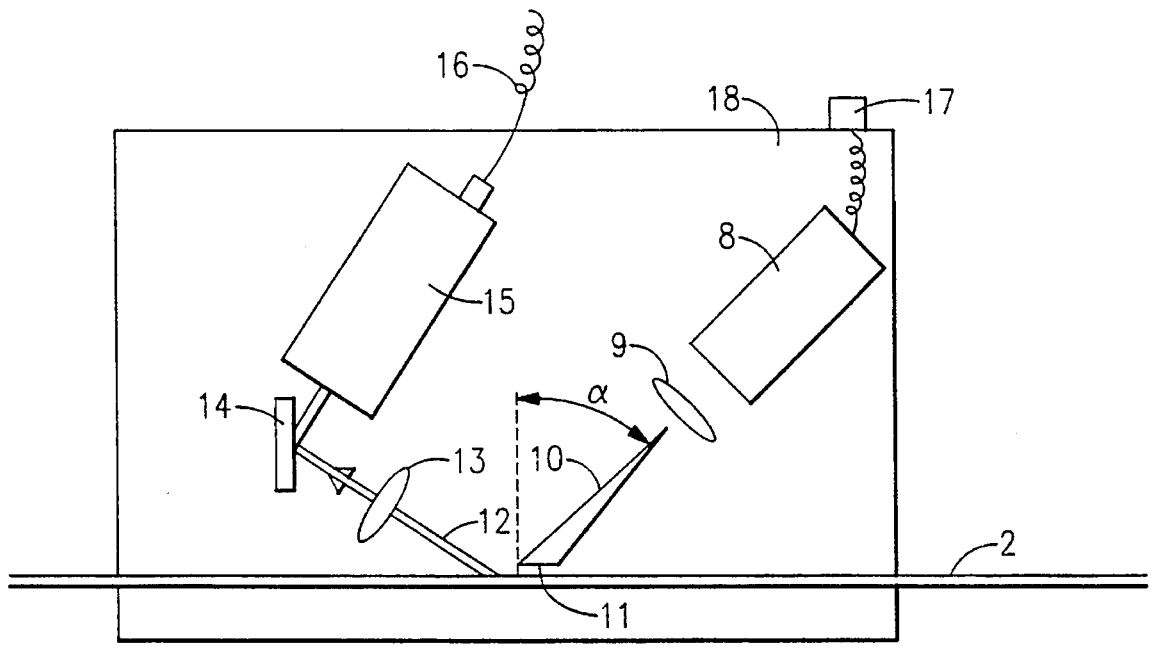
FIG. 2 is a diagrammatic representation of the measurement head of the device according to the invention.
Figure 3:
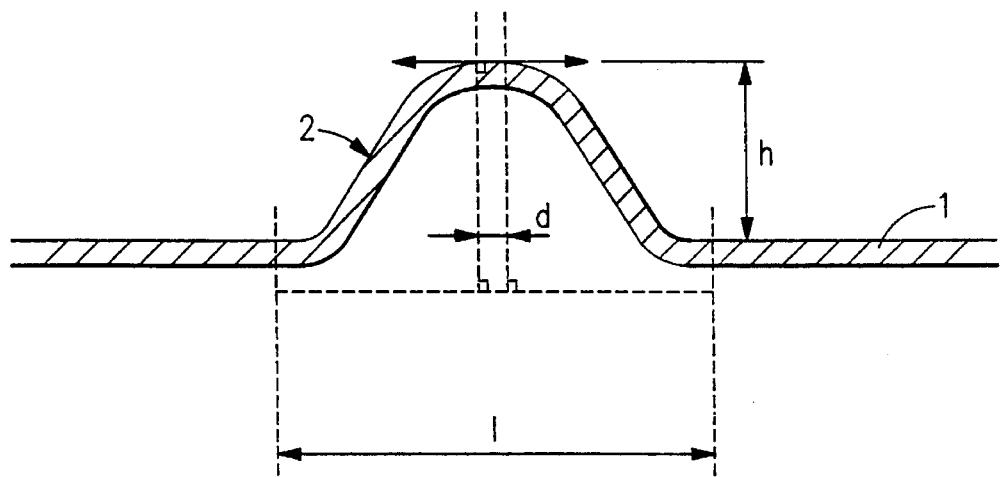
FIG. 3 is sectional diagrammtic representation of a sheet of board furnished with a crease and portraying the various characteristics measured.

The principle of operation of the setup of the device according to the invention has been represented diagrammatically. This device consists basically of two distinct parts, respectively a measurement head (3), described in detail subsequently in connection with FIGS. 2 and 4, and a processing assembly (4), possibly associated with a sensory restore unit, typically a video screen (7).

Figure 1:
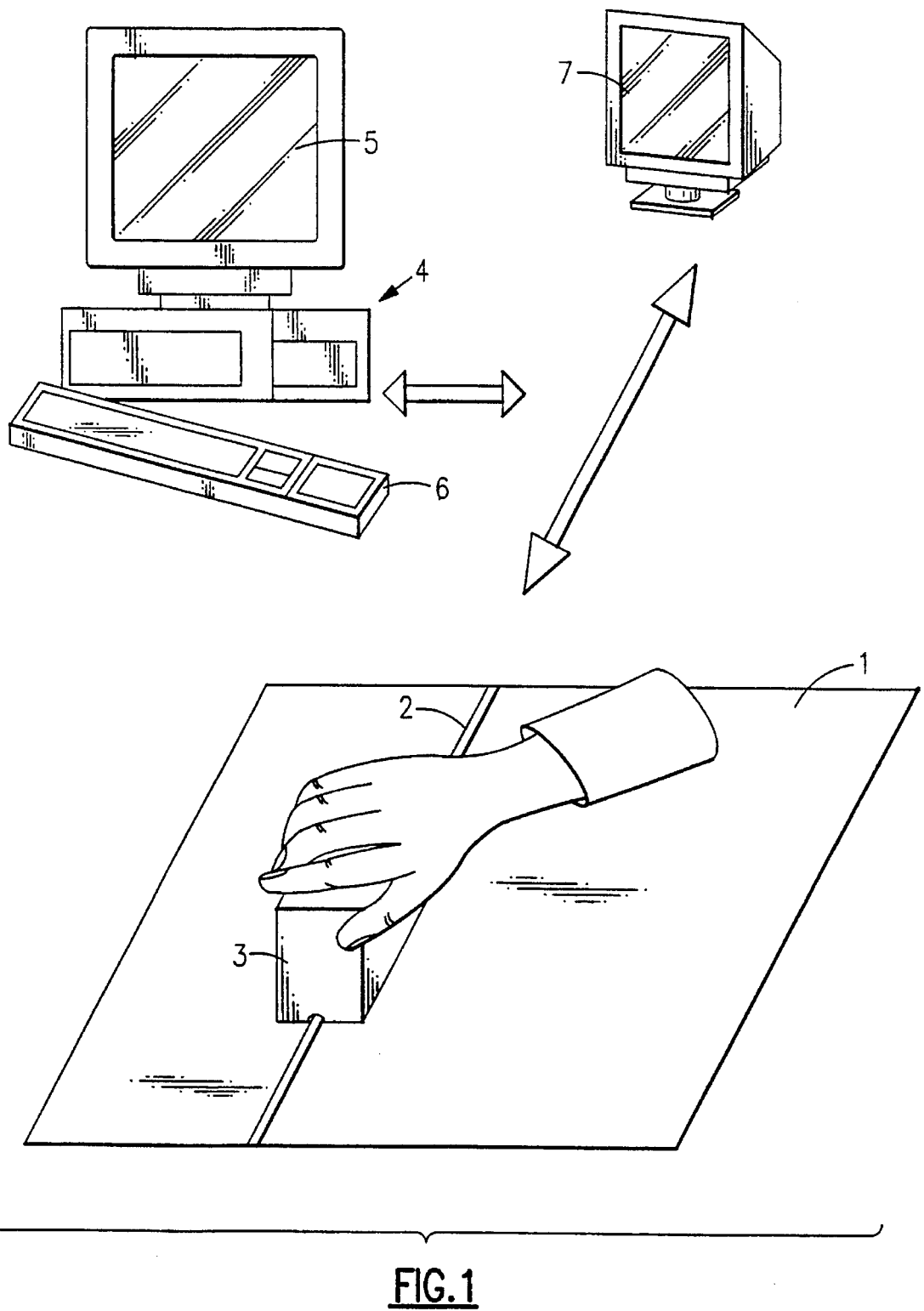
FIG. 1 is a diagrammatic representation of the principle of the operation of the device according to the invention.

The measurement head (3), as may be observed in FIG. 1, is of easily graspable size, such that it can be readily manipulated and set in place equally easily so as to enable the sought-after measurement to be accomplished.

Typically, all of the elements of which it is composed are selected with the aim of reducing as far as possible the size of this low-weight measurement head (3). This weight is typically from 500 to 800 grams. This measurement head (3) basically comprises a housing (18) of parallelepipedal shape, closed on all its faces with the exception of its base, and intended to come into position opposite the sheet of paper or board level with the crease, as will be described subsequently.

It comprises, firstly, a collimated light source (8) and in particular a laser diode of low power, typically less than 3 mW, emitting electromagnetic radiation in the visible region, for example at 675 nanometers. In fact, given the choice of wavelength and of power emitted, it is possible to use the measurement head in complete safety, to fulfil the operating tests in a simple manner and to favor the positioning of the head (3) at the level of the paper (1).

This laser diode is supplied by means of a miniaturized stabilized power supply, operating at a voltage compatible with the voltages available with the processing assembly described in detail below.

The beam emanating from the laser diode (8) next passes through a plano-cylindrical lens of focal length −6.35 mm, whose function is to convert said laser beam into a beam (10) which is transformed, level with the crease (2) examined, into a line (11) perpendicular to said crease.

The beam (12), backscattered from the crease and the sheet of paper illuminated by this line (11), travels through an objective (13) of focal length 1.25 mm, focusing this beam (12) onto the matrix of a camera (15), typically a CCD or charge transfer camera, having a definition at least equal to 512×512 pixels.

Advantageously and with the aim of compactness, a mirror (14), oriented substantially at 45° with respect to the emergent beam (12), is interposed between the objective (13) and the camera (15).

By construction, the distance between the plano-cylindrical lens (9) and the surface of the sheet of paper to be examined determines the length of the luminous line (11) illuminating the crease.

In parallel, the angle of emission and of reception of the beam respectively (10) and (12) with respect to the plane of the sheet is determined so as to avoid specular reflection as far as possible. For paper and board, this angle is around 56°.

Finally, the measurement head includes a push-button (17), actuated by the user and intended to allow data acquisition, that is to say acquisition and processing by the associated microcomputer of a video image.

By dint of its structure, this measurement head is very stable and is moreover designed so as to be dust-proof, this so as not to expose the inside of the head to the external environment, with the exception of the external surface of the objective (13) and of the plano-cylindrical lens (9), access to these two surfaces moreover being made easier so as to provide for their possible cleaning.

Figure 4:
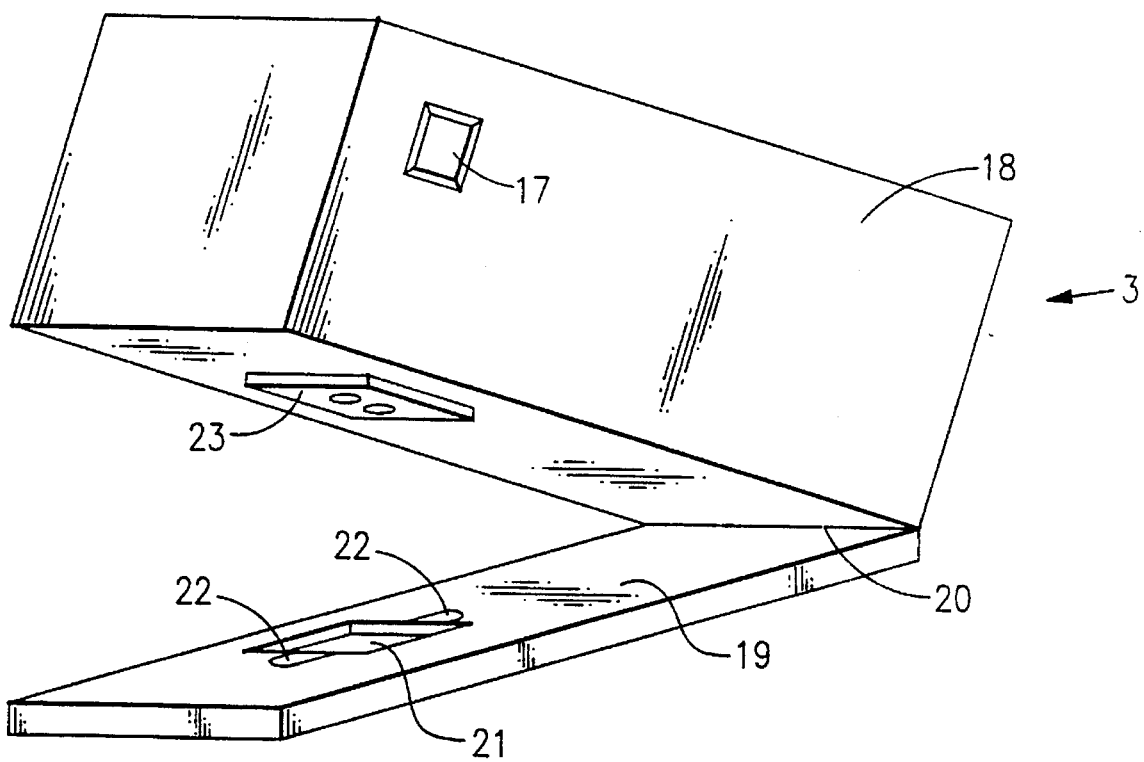
FIG. 4 is a diagrammatic representation in perspective of the measurement head according to another embodiment of the invention.

Represented in FIG. 4 is another embodiment of the measurement head. Although the internal structure of this head remains the same, especially in terms of optical paths and components, the external housing consists of two parts, namely the housing proper (18) hinged to a flat plinth (19) at one of the ends of its base along a hinging axis (20). At rest, that is to say in the absence of any external stress exerted in particular by the user, the housing (18) is in the open position, such as portrayed in FIG. 4. For this purpose, the plinth (19)/housing (18) assembly is for example furnished with a spring (not represented) affording retention in this position, in the fashion of a stapler.

Thus, as can be observed, the plinth (19) includes a through viewing window (21), furnished with centering tags (22), which are intended to allow the operator to perform a correct positioning of the measurement head level with the crease to be examined. These tags (22) are arranged on either side of the window (21) and substantially in a central position with respect thereto.

When the operator desires to examine a crease, he positions the plinth (19) level with the part of said crease which he wishes to examine. To do this, he uses the viewing window (21) to frame said crease so that the latter coincides with the centering tags (22), in such a way that said crease is perpendicular to the laser streak (11) emitted by the head (3) and exiting the housing (18) at (23). Having done this framing, the operator swings said housing (18) on the plinth (19) about the hinging axis (20), so as to bring the housing (18) into contact with the plinth (19), and more specifically, to allow the introduction of the exit zone (23) of the laser streak (11) into the viewing window (21). It is therefore appreciated that, for this purpose, the projection inherent in the exit zone (23) corresponds substantially to the volume freed by the viewing window (21).

Having thus swung the housing (18), the operator can check for correct framing of the crease via the video screen (7) and then actuate the push-button (17) so as to make the measurement. Having made this measurement, the operator releases the housing (18), the latter then reassuming its initial "open" configuration.

The processing assembly (4) is intended to harness the information acquired by the camera (15), and which travels to it via the coaxial cable (16). Typically, this processing assembly consists of a microcomputer of the PC compatible type, incorporating a keyboard (6) and a screen (5), allowing setup of the software for processing the data acquired.

Acquisition of the image captured by the camera is performed by means of an acquisition and processing card incorporated into the microcomputer. Synchronization between the camera and the card is carried out by the card itself on the video signal received. This digitizing is formed on 8 bits which provides for 256 different gray levels.

The software incorporated into the microcomputer is intended to determine the following three parameters of the crease:

firstly, the width l of this crease;

its height h;

and finally its off-centering d, the off-centering consisting of the offset of the point of maximum height h of the crease with respect to the mediator of the straight-line segment stretching between the two reference points for measuring the width.

To do this, the software incorporated into the microcomputer searches for the set of points which mark the plane of the sheet. Next, it searches for and stores the light spots which portray the shape of the crease. These spots form a curve which follows the shape of the crease. This curve being slightly disturbed by the rough surface of the paper, the software then performs a first-order discrete filtering of the curve thus obtained.

Finally, it determines the characteristics of the shape examined, especially its height h, its width l and its off-centering d on the basis of identification of the start and end of the crease, according to a parameterizable model.

For example, the thresholds defining the start and end of the crease are detected when the measured points exceed 40 μm in ordinate with respect to the reference plane already determined and corresponding to the upper plane of the sheet (1). The width l and the off-centering d can thus be deduced from these two thresholds. These three results are displayed at the screen (5) of the microcomputer.

Therefore, when the controller of the scoring machine wishes to examine creases, he positions the measurement head (3) on the sheet (1) level with the crease (2), as has been represented in FIG. 1, and then, via the push-button (17), he triggers the measurement, the positioning of the measurement head on the sample being made easier moreover by the video screen (7).

After each measurement, the operator can obtain, as he so desires, either a summarized presentation of the measurement, which comprises:

a reminder of the fixed quantities (height, width, off-centering and tolerance);

the three results from the measurement (height h, width l and off-centering d);

any possible warnings of nonconformity of the measurements with the fixed quantities; or these same results accompanied by a plot of the profile of the crease and of the variables which have parameterized the measurements.

The duration of such a measurement is around 3 seconds, with a microcomputer operating with a 16 Megahertz 386 processor.

It thus enables the profile of the crease to be inspected in a simple, convenient and particularly fast way.

As stated in the preamble, it can also allow the inspection of dies which make it possible to produce these indentations.

Although in the example described the device of the invention operates in a discrete manner, such a device is of course adaptable to continuous operation, especially on a line for manufacturing packages prior to folding them.

Moreover, the magnification and hence the accuracy of the measurement can be modifiable as a function of the objectives or lenses used, or of the number of pixels, and hence of the resolution of the camera.

We claim:

1. Apparatus for measuring a relief profile line contained upon a planar surface of a substrate that includes:

a hand-held measurement head that further includes, a light source and a lens means for converting a beam of light emanating from said source into an image in the form of a luminous streak that is perpendicular to a relief profile line being measured wherein the orientation of said beam of light is effected at an angle of incidence ($\alpha$) having a value about equal to the Brewster angle of the substrate, means for focussing back-scattered light from the illuminated relief profile line upon a matrix camera which converts received analog light signals into digital output signals, and processing means connected to said camera for processing said digital signals to determine at least one of the geometrical characteristics defining the relief profile line.

2. The apparatus of claim 1 wherein said processing means is adapted to determine the height (h) of said relief profile line with respect to the plane of the substrate, the width (l) of said relief profile line, and the off centering (d) of said relief profile line defined by the offset of a point of maximum height of the relief profile line with respect to the mediator of a straight line segment extending between two reference points for measuring said width.

3. The apparatus of claim 1 wherein said light source is linearly polarized and its direction of polarization is parallel to the plane of incidence of said beam of light on a said substrate.

4. The apparatus of claim 1 wherein the angle of incidence is about 56°.

5. The apparatus of claim 1 wherein said matrix camera is a charge couple device (CCD) having at least a 512×512 pixel matrix and electronic gain control.

6. The apparatus of claim 1 wherein the measurement head further includes a housing of parallelepipedal shape and a triggering means for controlling the light source.

7. The apparatus of claim 6 wherein said housing includes a flat plinth hinged to said housing along an axis, said plinth being arranged to be positioned on said substrate level with the relief profile line, said plinth having a viewing window and tags for centering said relief profile line in said window to insure the relief profile line is perpendicular with the luminous streak.

8. The apparatus of claim 1 that further includes a mirror positioned about 45° to the back-scattered light and is interposed between said matrix camera and said means for focussing said back-scattered light.

9. The apparatus of claim 1 wherein said processing means includes a sensory restore unit for allowing the viewing of digital signals from the camera.

10. The apparatus of claim 1 wherein said processing means includes a microcomputer.

11. Apparatus for measuring a raised relief profile line made along a paper substrate that includes a hand-held measuring head that further includes, a collimated light source having a laser diode and a plano-cylindrical lens for converting a laser beam into a line that is perpendicular to said relief profile line, said laser beam be oriented so it has an angle of incidence of about 56° with respect to said relief profile line, an objective lens arranged to focus back-scattered light reflected from the substrate, a matrix camera having a charge transfer circuit for receiving said reflected light and converting the received information into digital output signals, and a processing unit connected to said camera, said unit including a micro-computer having a calculator for determining the geometrical characteristic of said relief profile line relating to the height the width, and the linearity of said line.

* * * * *